United States Patent [19]

Plutschuck et al.

[11] Patent Number: 4,708,543
[45] Date of Patent: Nov. 24, 1987

[54] COARSE RADIAL ADJUSTMENT BORING QUILL

[75] Inventors: Lawrence Plutschuck, Warren; Carl E. Hunt, Milford, both of Mich.

[73] Assignee: GTE Valeron Corporation, Danvers, Mass.

[21] Appl. No.: 720,570

[22] Filed: Apr. 5, 1985

[51] Int. Cl.⁴ .......................................... B23B 29/034
[52] U.S. Cl. .......................................... 408/151; 279/6
[58] Field of Search ............. 408/146, 147, 150, 151, 408/153, 154, 155, 156, 158, 163, 173, 178; 279/10, 6

[56] References Cited

U.S. PATENT DOCUMENTS

| 1,907,408 | 5/1933 | Schimmel | 279/6 |
| 2,151,251 | 3/1939 | Weidner | 279/6 |
| 2,564,460 | 8/1951 | Blanco | 279/6 |
| 2,588,815 | 7/1951 | Briney, Jr. | 279/6 |
| 2,780,467 | 2/1957 | Jackson | 279/6 |
| 3,000,290 | 9/1961 | Ecleads | 408/151 |
| 3,254,548 | 6/1966 | Gersch | 408/150 |
| 3,640,633 | 2/1972 | Gersch et al. | 408/150 |
| 3,753,624 | 8/1973 | Walker et al. | 408/154 |
| 4,053,252 | 10/1977 | Gersch | 408/150 |
| 4,097,179 | 6/1978 | Gersch | 408/151 |

FOREIGN PATENT DOCUMENTS 1101098  3/1961  Fed. Rep. of Germany ...... 408/150

Primary Examiner—Z. R. Bilinsky
Attorney, Agent, or Firm—Lloyd M. Forster

[57] ABSTRACT

Coarse radially adjustable tool holder employing eccentric adjustment ring combined with linear guide means confining tool point to linear adjustment path within fine adjustment eccentric bushing such as provided by "Briney Precision Adjustment Tool".

12 Claims, 9 Drawing Figures

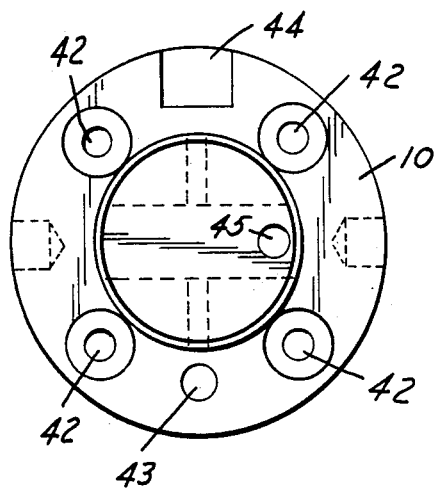
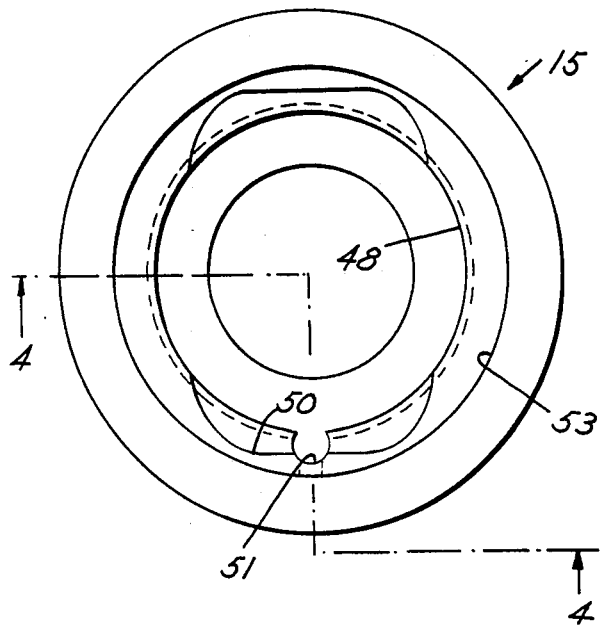
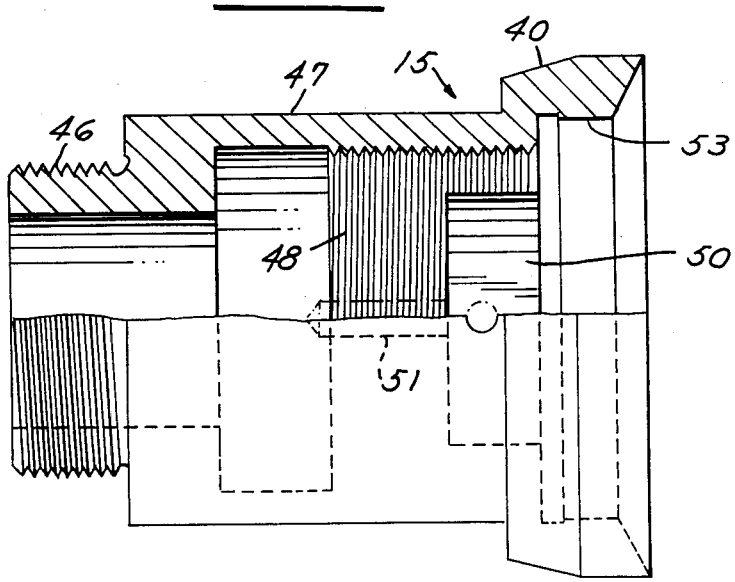

4,708,543

COARSE RADIAL ADJUSTMENT BORING QUILL

BACKGROUND OF THE INVENTION

"Fine" radial adjustment boring quills, e.g. with a radial adjustment range of 0.005-0.010", are known in the art where adjustment is effected through an eccentric sleeve or ring having cylindrical O.D. and I.D. axial centers offset up to 0.005" providing up to 0.010" radial adjustment over a 180° rotation of the eccentric bushing within the circular bore of an adapter. A commercial tool of this type, known in the trade as a "Briney Precision Adjustment Tool", has an adjustment eccentric bushing calibrated relative to an adapter body to indicate radial quill position responsive to bushing rotation which may be effected rapidly without loosening any clamping or set screw element.

In such fine adjustment tools, adjustment of the boring bar causes the quill machining point to move in an arcuate path changing slightly its rake angle to a workpiece surface. The small dimensional change involved in such fine adjustment renders the magnitude of change in rake angle correspondingly small and relatively insignificant as far as cutting action at the boring point. However, a coarse adjustment, e.g. in the order of 0.100–0.125", effected through such conventional eccentric bushing adjustment would involve an unacceptable or undesirable change in rake angle for many boring applications. Accordingly, for coarse radial adjustment of a boring quill it is desirable if not essential to effect movement of the tool point along a fixed linear centerline at all times throughout minimum to maximum adjustment without change in radial rake.

In certain of the "Briney" tools a coarse radial adjustment has been provided through the provision of a transverse key slot in the tool holder for retaining a transverse square bar with a cutting insert at its end which may be adjusted manually and held by set screw or by clamping the key slot.

An eccentric boring head disclosed in U.S. Pat. No. 2,780,467 provides a coarse adjustment feature which maintains a linear path of adjustment through the use of a T-slot in an adapter engaged by a T-head in the tool carrying member received slidably within the T-slot. The tool carrying member has a threaded cylindrical surface on which a lock nut may be tightened to draw shoulders of the T-head into tight engagement after linear adjustment is effected through an eccentric ring. The lock nut must be loosened to permit rotation of the eccentric ring and retightened after each adjustment. A fine adjustment feature provided in the disclosure of the '467 patent also requires loosening of lock and set screws to permit an adapter to be rotated in the body of the tool.

BRIEF DESCRIPTION OF THE PRESENT INVENTION

It is an object of the present invention to equip a Briney precision adjustment tool with provision for coarse radial adjustment along a linear centerline path for the cutting point which requires no loosening of set screw or lock nut to effect adjustment and which may be installed in a Briney tool holder having fine adjustment with a minimum of alteration. In place of a Briney cylindrical tool holder mounted within the fine adjustment eccentric bushing, an inner bushing is employed, with a drive connection to the outer adapter body, internally threaded to receive a slotted drive ring pinned upon assembly to the inner bushing for engaging flatted sides of a boring bar holder for accommodating adjustment in a radial linear path. The inner bushing is also provided with an inner cylindrical bearing surface for a coarse eccentric adjustment ring for engaging the boring bar holder at diametrically opposite lines axially spaced from the flatted portion. A central axially extending cap screw engaging the boring bar holder has Belleville spring washers preloaded by the threaded drive ring to hold shoulder surfaces of the boring bar holder, coarse eccentric adjustment ring, and inner bushing in operative inter-engagement while accommodating rotation of the coarse eccentric adjustment ring by suitable spanner wrench without the necessity of loosening any element of the tool. The inner bushing is likewise held in compressive engagement with the fine adjustment eccentric bushing and outer adapter body by a plurality of spring loaded cap screws.

A combination tool providing the present coarse adjustment feature within a conventional "Briney" fine adjustment mounting provides a highly desirable tool with both extreme precision of adjustment and extended range of adjustment with no material change in radial rake angle and with no need to loosen any element to effect either fine or coarse adjustment.

BRIEF DESCRIPTION OF THE DRAWINGS

FIG. 3 is an end view of the adapter per se illustrated in FIG. 1 in enlarged scale;

FIG. 4 is a partially sectioned side elevation of a bushing per se illustrated in the assembly drawing of FIG. 1;

FIG. 5 is an end view of the bushing of FIG. 4;

Figure 1:
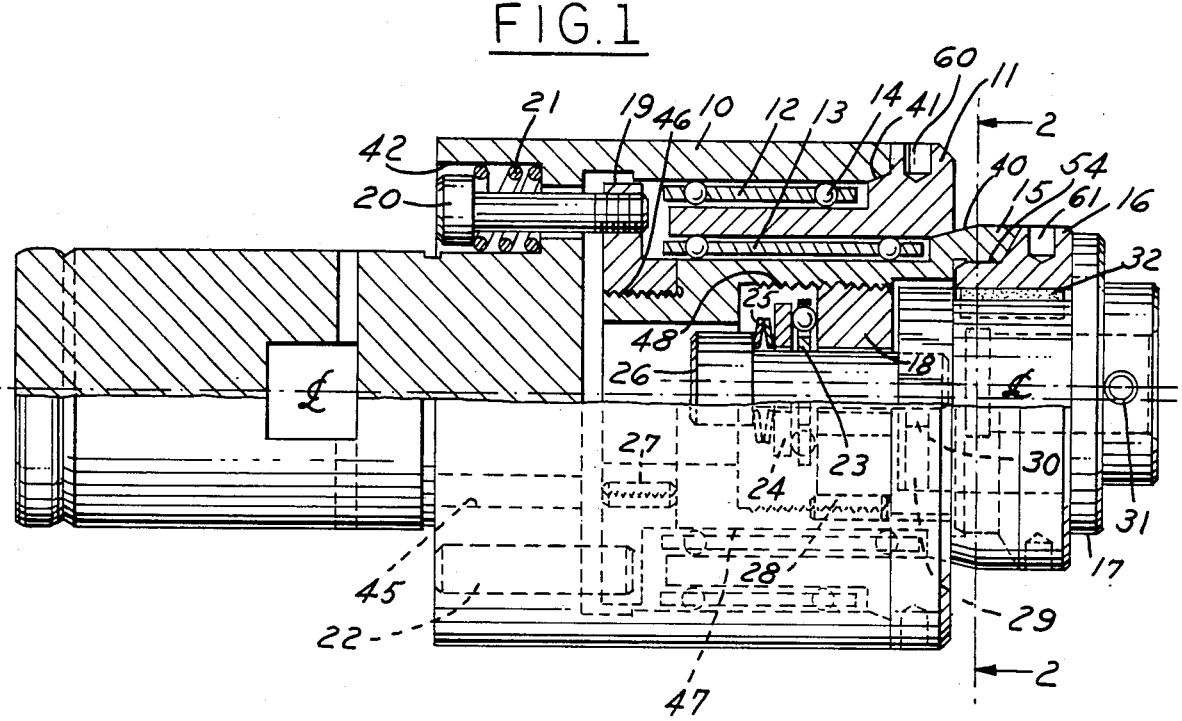
FIG. 1 is a sectional side elevation of a preferred embodiment providing both coarse and fine adjustment.
Figure 2:
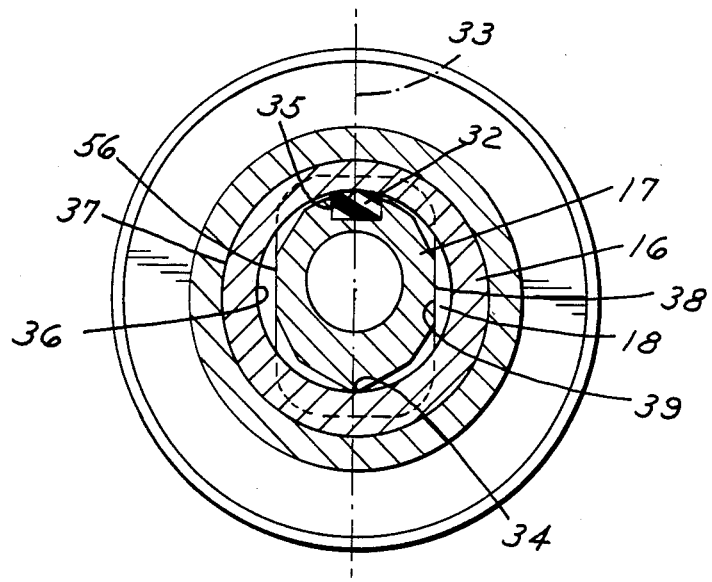
FIG. 2 is a sectional view taken along the line 2—2 of FIG. 1.

With rerference to FIGS. 1 and 2 of the drawings, the elements in the combination coarse and fine radial adjustment boring quill tool holder include adapter body 10; fine adjustment eccentric bushing 11; outer radial ball bearing cage 12; inner radial ball bearing cage 13, each with bearing balls 14; inner bushing 15; coarse eccentric adjustment ring 16; boring bar holder 17; drive ring 18; drive plate 19; cap screw 20; compression spring 21; drive dowel 22, thrust bearing 23; thrust washer 24; Belleville spring washers 25; cap screw 26; pull drive dowels 27, and set screw 29; brass shoe 30; set screw 31; and urethane rubber spring 32.

A brief description of the operation of these elements will be followed by a detailed description of the novel more critical elements, particularly relating to the coarse radial adjustment effected through rotation of ring 16.

In the embodiment of FIGS. 1 and 2 adapter 10 houses adjustment ring 11, having outer and inner slightly eccentric cylindrical surfaces engaging respectively outer bearing 12 and inner bearing 13 for effecting fine adjustment of up to 0.010" in the radial position of bushing 15 through 180° rotation of bushing 11.

This adjustment conforms to conventional "Briney Precision Adjustment Tools" which are commercially known in the art resulting in a slight orbital path for bushing 15 during rotation of adjustment bushing 11. The effect of such slight orbital path on the rake angle of a boring tool installed in bar holder 17 is relatively slight and insignificant; however, if the eccentricity of adjustment bushing 11 were increased sufficiently to effect a relatively coarse adjustment, e.g. in the order of 0.100" to 0.125", the effect on the rake angle of the cutting point would be more substantial and undesirable in its effect on the cutting action of the boring tool.

In order to maintain the coarse radial adjustment of the boring bar on a straight linear path 33, which will not effect the rake angle of the cutting point, boring bar holder 17 is constructed to engage only diametrically opposite contact points 34 and 35 on eccentric adjustment ring 16 when the center line of eccentricity of ring 16, including the center of revolution of cylindrical surface 36, coincides with linear path 33 which is on-center with the axis of revolution of cylindrical surface 37. Holder 17 is constrained to follow linear path 33 by engagement of key flats 38 with flat keyway guide surfaces 39 of drive ring 18. Urethane spring 32 serves to maintain metal to metal contact of holder 17 with eccentric surface 36 at point 34 while accommodating the slight shortening of diametrical distance to effective chord length during rotation of adjustment ring 16 moving the center of internal cylindrical surface 36 off of linear path 33 establishing a chordal relation of contact points 34 and 35 with cylindrical surface 36.

Four equally spaced cap screws 20 reacting on compression springs 21 maintain compressive engagement of matching conical surfaces 40 between bushing 15 and eccentric bushing 11 as well as matching conical surfaces 41 between bushing 11 and adapter 10. Likewise compressive engagement is maintained between holder 17, eccentric adjustment ring 16 and bushing 15 by Belleville spring washers 25 reacting against drive ring 18 through bearing 23, washer 24 and cap screw 26 having threaded engagement with boring bar holder 17.

Referring now to the figures illustrating the detailed construction of certain critical elements, FIG. 3 showing an end view of adapter 10 illustrates the equal spacing of four counter sunk holes 42 for cap screws 20 and compression springs 21; hole 43 for dowel 22, aligned with key slot 44 for an adapter drive key not illustrated in FIG. 1 where the upper sectioned portion is rotated 45° out of true phase to illustrate cap screws 20; drill hole 45 provided as an access hole for pulling dowel 27 when disassembly of bushing 15 is desired by unthreading from drive plate 19, the drilled hole in drive plate 19 and bushing 15 for such pull dowel being established by drilling through at assembly after threading bushing 16 into drive plate 19 up to the shoulder engagement position shown.

Figure 6:
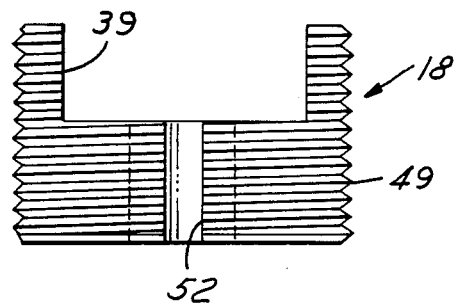
FIG. 6 is a side elevation of a drive ring per se shown in the assembly drawing of FIG. 1.
Figure 7:
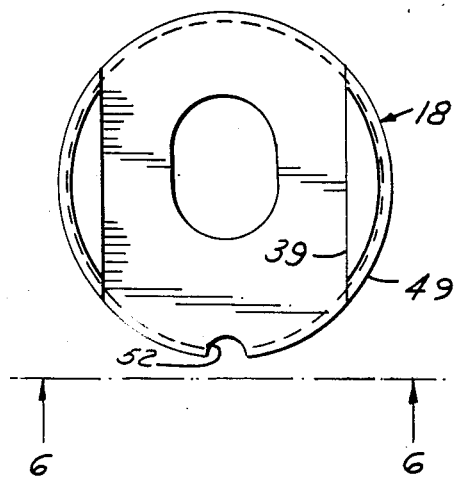
FIG. 7 is an end view of the ring of FIG. 6.

With reference to FIGS. 4 and 5 illustrating the detailed construction of bushing 15, threaded end 46 engages threaded drive plate 19; cylindrical bearing surface 47 engages radial ball bearing 13; concentric internal thread 48 engages the threaded O.D. 49 of drive ring 18 (FIG. 6 and 7); relief recesses 50 provide clearance for radial adjustment of tool holder 17 (FIGS. 8 and 9); and drilled hole 51 through the remaining thread 48 in alignment with the linear path of adjustment 33 serves in combination with matching groove 52 drilled in the threaded O.D. 49 of drive ring 18 as a seat for pull dowel 28 when the respective matching grooves are threaded into alignment at their operating position illustrated in FIG. 1; and cylindrical surface 53 concentric with bearing surface 47 pilots the O.D. 54 of eccentric adjustment ring 16.

Optionally, in place of threaded connection 48, 49 between bushing 15 and drive ring 18 secured against relative rotation by dowel 28, the two elements may be welded, or constructed as an integral single element with equivalent functional surfaces.

Figure 8:
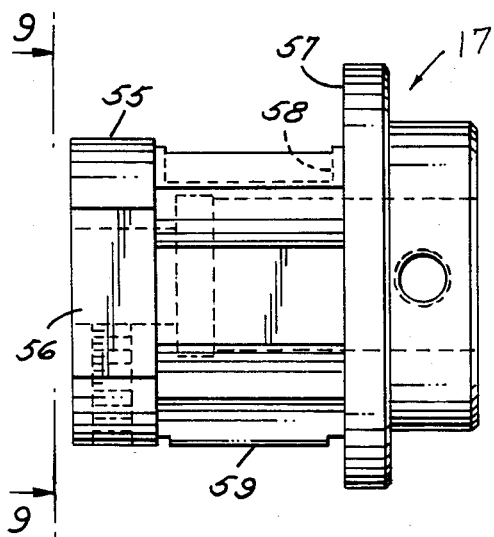
FIG. 8 is a side elevation of a boring bar holder per se illustrated in the assembly drawing of FIG. 1.
Figure 9:
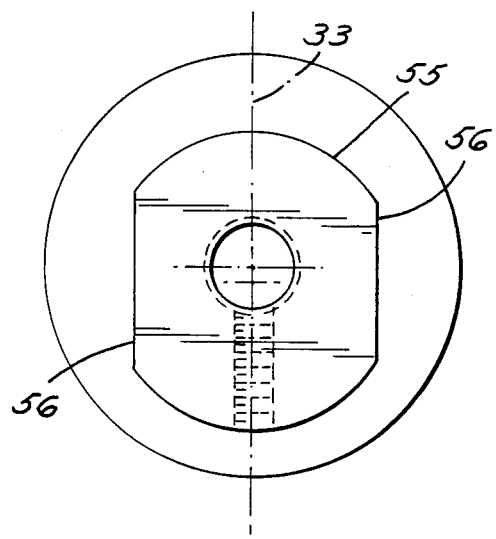
FIG. 9 is an end view of the holder of FIG. 8.

With reference to FIGS. 8 and 9 illustrating the detailed construction of boring bar holder 17, cylindrical extension 55 is provided with key flats 56 engaging keyway flats 39 in drive ring 18 (FIGS. 6 and 7) serving to maintain the center line 33 on the straight adjustment path shown in FIG. 2; face 57 is held in abutting engagement with adjustment ring 16 under compression of Belleville washers 25 serving to stabilize the boring bar for its cutting action at any radial position: pocket 58 for urethane spring 32 is located opposite contact ridge 59 for engagement at contact point 34 of adjustment ring 16 as illustrated in FIG. 2.

Rotation of adjustment ring 32 involves sliding engagement by anti-friction bearing 23 without imposing cocking loads on boring bar holder 17.

It will be understood that adjacent surfaces of adapter 10 and bushing 11 are provided with matching graduations for accurately calibrating fine adjustment position and like matching graduations are provided on adjacent surfaces of bushing 15 and adjustment ring 16. In either case adjustment is effected through suitable spanner wrench engaging respective recesses 60 or 61. With 0.005" eccentricity in the ID of bushing 11 and 41 graduations distributed over 180°, a maximum tool movement of 0.010" with a precision of 0.0005" diametrical adjustment for each graduation is achieved in the fine adjustment while like number of graduations with an eccentricity of 0.050" and diametrical tool movement of 0.100" will provide graduations equal to 0.005" on diameter.

We claim:

1. Radially adjustable boring quill comprising bushing means, eccentric adjustment ring means having inner and outer surfaces of revolution about parallel offset axes, means for assembling said ring and bushing means for relative adjustment rotation about said eccentric adjustment ring outer surface axis of revolution, said means for assembling including tool holder means engaging said inner surface of revolution at diametrically opposed contacts, linear guide means for said tool holder means confining its movement to a linear radial path during adjustment rotation of said adjustment ring while the axis of said inner surface of revolution moves in a circular arcuate path, and resilient means yieldable to said adjustment rotation for compressively loading said tool holder, ring and bushing means in operative adjustable engagement sufficiently to retain an adjusted position of said tool holder means during tool operation.

2. Mechanism of claim 1 including resilient contact means at one extremity of said diametrically opposed engagement contacts for accommodating change in effective chordal dimension between engagement contacts while maintaining rigid contact at the other extremity.

3. Mechanism of claim 2 wherein said resilient contact means comprises a urethane spring seated in said tool holder means under compression contact with said inner surface of revolution.

4. Mechanism of any of claims 1–3 wherein said linear guide means comprises inter-engaging key and keyway surfaces operative on an axial extension of said tool holder means beyond its engagement contacts with said eccentric adjustment ring, and means on said bushing means for establishing the path of said key and keyway surfaces in fixed relation to said bushing means.

5. Mechanism of claim 4 wherein said inter-engaging key and keyway surfaces comprise parallel flats on said extension, and a ring with slotted keyway in fixed association with said bushing means.

6. Mechanism of claim 5 including a tensile element connected to said tool holder means, and wherein said resilient means comprises anti-friction thrust bearing and spring means interposed between said slotted ring and said tensile element.

7. Mechanism of claim 1 wherein a relatively fine radial adjustment means is superimposed on said bushing means, including adapter means for holding said combined fine adjustment means and coarse adjustment means, whereby an initial adjustment of said tool holder means may be made relative to said adapter by said adjustment ring and a relatively fine final adjustment means of said bushing means including said tool holder means may next be made relative to said adapter.

8. Mecahnism of claim 7 wherein said fine adjustment means comprises an eccentric bushing interposed between said adapter and said bushing means, means for retaining said adapter and bushing means against relative rotation, and means for accommodating adjustment rotation of said fine adjustment eccentric means.

9. Mechanism of claim 8 including resilient means for preloading said bushing means against said fine adjustment eccentric means and said fine adjustment means against said adapter.

10. Mechanism of claim 9 including resilient tension means for drawing said bushing means into said adapter with said fine adjustment eccentric means interposed between.

11. Mechanism of claim 10 including rotary drive means between said adapter and said bushing means, and rotary drive means between said bushing means and said tool holder means including linear key and keyway surfaces accommodating linear radial adjustment of said tool holder means relative to said bushing means.

12. Mechanism of claim 4 wherein said inter-engaging key and keyway surfaces comprise parallel flats on said extension, and a slotted keyway in integral association with said bushing means.

* * * * *